(12) United States Patent
Yabu et al.

(10) Patent No.: US 6,771,685 B1
(45) Date of Patent: Aug. 3, 2004

(54) DISCHARGE ELECTRODES CONNECTING STRUCTURE FOR LASER APPARATUS AND LASER APPARATUS THEREWITH

(75) Inventors: Takayuki Yabu, Hiratsuka (JP);
Takanobu Ishihara, Oyama (JP);
Takashi Matsunaga, Oyama (JP);
Yasufumi Kawasuji, Oyama (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/648,632

(22) Filed: Aug. 28, 2000

(51) Int. Cl.[7] .............................................. H01S 3/097
(52) U.S. Cl. ............................. 372/87; 372/57; 372/59
(58) Field of Search ............................. 372/57, 59, 87, 372/50, 58, 61

(56) References Cited

U.S. PATENT DOCUMENTS

| | | | | |
|---|---|---|---|---|
| 4,051,855 A | * | 10/1977 | Schneiderman | 606/42 |
| 5,771,258 A | * | 6/1998 | Morton et al. | 372/57 |
| 6,128,323 A | * | 10/2000 | Myers et al. | 372/57 |
| 6,608,853 B1 | * | 8/2003 | Yoshioka et al. | 372/87 |
| 6,628,693 B1 | * | 9/2003 | Ishihara et al. | 372/87 |
| 6,639,929 B2 | * | 10/2003 | Mizoguchi et al. | 372/57 |

FOREIGN PATENT DOCUMENTS

JP         1-268078         10/1989

* cited by examiner

*Primary Examiner*—Don Wong
*Assistant Examiner*—Cornelius H. Jackon
(74) *Attorney, Agent, or Firm*—Armstrong, Kratz, Quintos, Hanson & Brooks, LLP

(57) ABSTRACT

The invention provides a discharge electrodes connecting structure for a laser apparatus in which a thickness of the return plate is set to be within an optimum range, and a laser apparatus employing the same. Accordingly, a laser apparatus is provided with a laser chamber (2) sealing a laser gas, a pair of anode (5A) and cathode (5B) provided within the laser chamber in an opposing manner, generating a discharge so as to excite a laser gas flowing therebetween and oscillating a laser beam, a conductive anode base (6) holding the anode, an insulative cathode base (8) holding the cathode, and a return plate (9) electrically connecting the anode base to the laser chamber so as to supply a current to the anode. A thickness (t) of the return plate is set to be equal to or more than 100 μm and equal to or less than 500 μm, and the return plate is arranged substantially in parallel to a gas flow of the laser gas flowing between the discharge electrodes.

2 Claims, 4 Drawing Sheets

DISCHARGE ELECTRODES CONNECTING STRUCTURE FOR LASER APPARATUS AND LASER APPARATUS THEREWITH

FIELD OF THE INVENTION

The present invention relates to a discharging laser apparatus, and more particular to a discharge electrodes connecting structure in a laser apparatus and a laser apparatus provided with the discharge electrodes.

BACKGROUND OF THE INVENTION

Conventionally, there has been known a discharge exciting laser apparatus which generates a discharge between discharge electrodes so as to excite a laser medium, thereby oscillating a laser beam, and the discharge exciting laser apparatus is, for example described in Unexamined Japanese Patent Publication No. 1-268078. FIG. 6 shows a structure of an excimer laser apparatus disclosed in the publication, and FIG. 7 shows a discharge electrode structure of the excimer laser apparatus disclosed in the publication.

In FIGS. 6 and 7, an excimer laser apparatus 101 is provided with a laser chamber 102 for sealing a laser medium such as a laser gas or the like. A pair of discharge electrodes 105A and 105B constituted by an anode 105A and a cathode 105B are arranged in an inner portion of the laser chamber 102 in an opposing manner. The anode 105A is fixed to a conductive anode base 106 and the cathode 105B is fixed to an insulative cathode base 108, respectively. A discharge is generated between the anode 105A and the cathode 105B so as to excite a laser gas shown by an arrow G flowing between the discharge electrodes 105A and 105B, thereby oscillating a laser beam.

Auxiliary ionization electrodes 118 and 118 are respectively arranged in both sides of the discharge electrodes 105A and 105B in an opposing manner, to which a high voltage current is supplied from a high voltage power source via an auxiliary ionization circuit and a current introduction terminal (not shown), thereby performing an auxiliary ionization.

The anode base 106 and the cathode base 108 are supported to keep a predetermined interval by a supporting post 110. Further, the anode base 106 and the laser chamber 102 are electrically connected by a plurality of return plates 109 arranged in a longitudinal direction of the discharge electrode to keep a predetermined interval. In this case, a connecting portion between a return plate 109 and the laser chamber is not clearly illustrated in the publication mentioned above. The return plate 109 is constituted by a conductive sheet member and is arranged in parallel to the gas flow G so as not to prevent the gas flow of the laser gas between the discharge electrodes 105A and 105B and so that a thin portion 109A is directed to an upstream side and a downstream side of the gas flow G with respect to the gas flow.

Further, a once through fan 114 for feeding the laser gas to a portion between the discharge electrodes 105A and 105B, and a heat exchanger 103 for cooling the laser gas heated between the discharge electrodes 105A and 105B due to the discharge are respectively arranged at predetermined positions within the laser chamber 102.

However, the conventional art disclosed in Unexamined Japanese Patent Publication No. 1-268078 has the following problems.

That is, in the conventional art, there is a description that the return plate 109 is formed in a thin sheet shape, a resistance of the laser gas is reduced and a rectifying effect for rectifying the gas flow G of the laser gas is expected as a thickness of the return plate 109 becomes thinner. However, it is known that when making the return plate 109 too thin, the return plate 109 vibrates due to the gas flow G so as to prevent the gas flow G and reduce a flow speed. Accordingly, the discharge becomes unstable and a power of the laser beam changes. Further, when making the thickness of the return plate 109 too thin, the resistance of the current flowing through the return plate 109 is increased, so that the discharge is not properly performed.

SUMMARY OF THE INVENTION

The present invention is made by solving the problems in the technique mentioned above, and an object of the present invention is to provide a discharge electrodes connecting structure for a laser apparatus in which a thickness of the return plate is set to be within an optimum range, and a laser apparatus employing the same.

In order to achieve the object mentioned above, in accordance with the present invention, there is provided a discharge electrodes connecting structure for a laser apparatus comprising:

a pair of anode and cathode provided within a laser chamber for sealing a laser gas in an opposing manner, generating a discharge so as to excite a laser gas flowing therebetween and oscillating a laser beam;

a conductive anode base holding the anode;

an insulative cathode base holding the cathode; and a return plate electrically connecting the anode base to the laser chamber so as to supply a current to the anode and having a thickness of equal to or more than 100 μm and equal to or less than 500 μm.

Further, in accordance with the present invention, there is provided a laser apparatus comprising:

a laser chamber sealing a laser gas;

discharge electrodes constituted by a pair of anode and cathode provided within the laser chamber in an opposing manner, generating a discharge so as to excite a laser gas flowing therebetween and oscillating a laser beam;

a conductive anode base holding the anode;

an insulative cathode base holding the cathode; and a return plate electrically connecting the anode base to the laser chamber so as to supply a current to the anode wherein a thickness of the return plate is set to be equal to or more than 100 μm and equal to or less than 500 μm, and the return plate is arranged substantially in parallel to a gas flow of the laser gas flowing between the discharge electrodes.

In accordance with the structure mentioned above, since the thickness of the return plate is made thin to a level equal to or less than 500 μm and the return plate is arranged in parallel to the gas flow, the return plate hardly disturb the gas flow of the laser gas flowing between the anode and the cathode. Further, since the thickness of the return plate is set to be equal to or more than 100 μm, the return plate does not vibrate due to the gas flow. Further, since the thickness of the return plate is made thicker than an entering depth of a high frequency current flowing on a surface of the return plate at a time of discharging, a resistance of the current is not increased and the discharge can be properly performed. Accordingly, the discharge becomes stable and a power of the laser beam becomes stable.

BEST MODE FOR CARRYING OUT THE INVENTION

A description will be in detail given below of an embodiment in accordance with the present invention with reference to the accompanying drawings.

Figure 1:
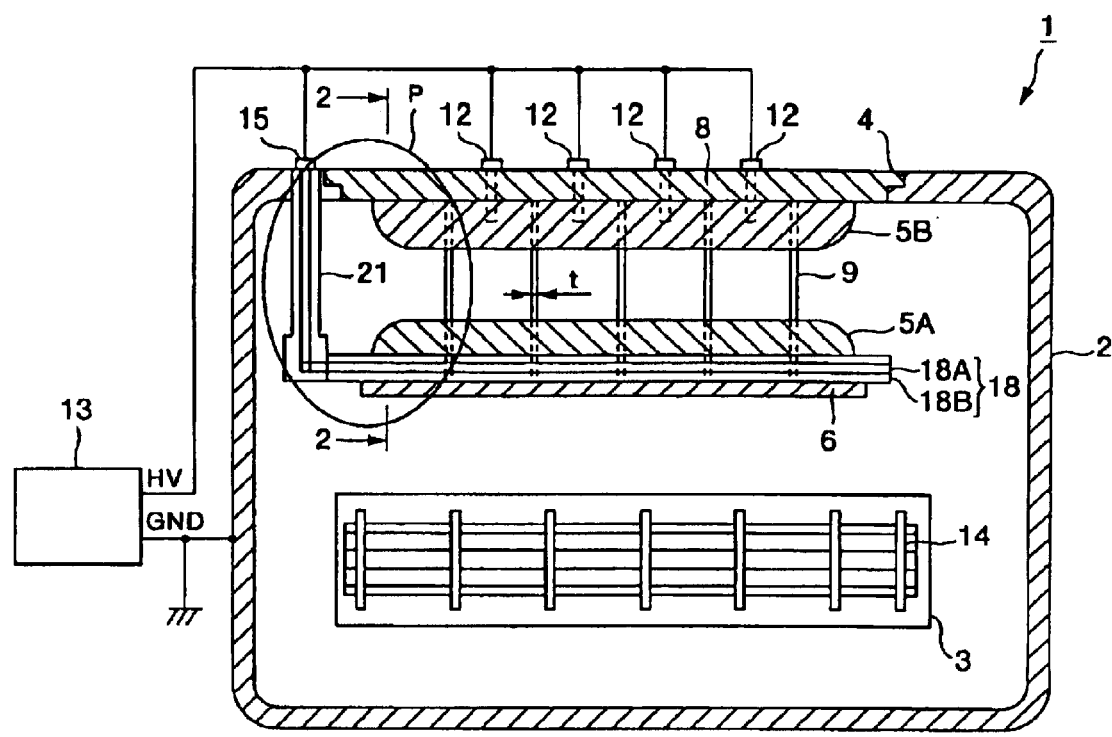
FIG. 1 is a schematic view of a laser apparatus provided with a discharge electrodes connecting structure in accordance with an embodiment of the present invention.
Figure 2:
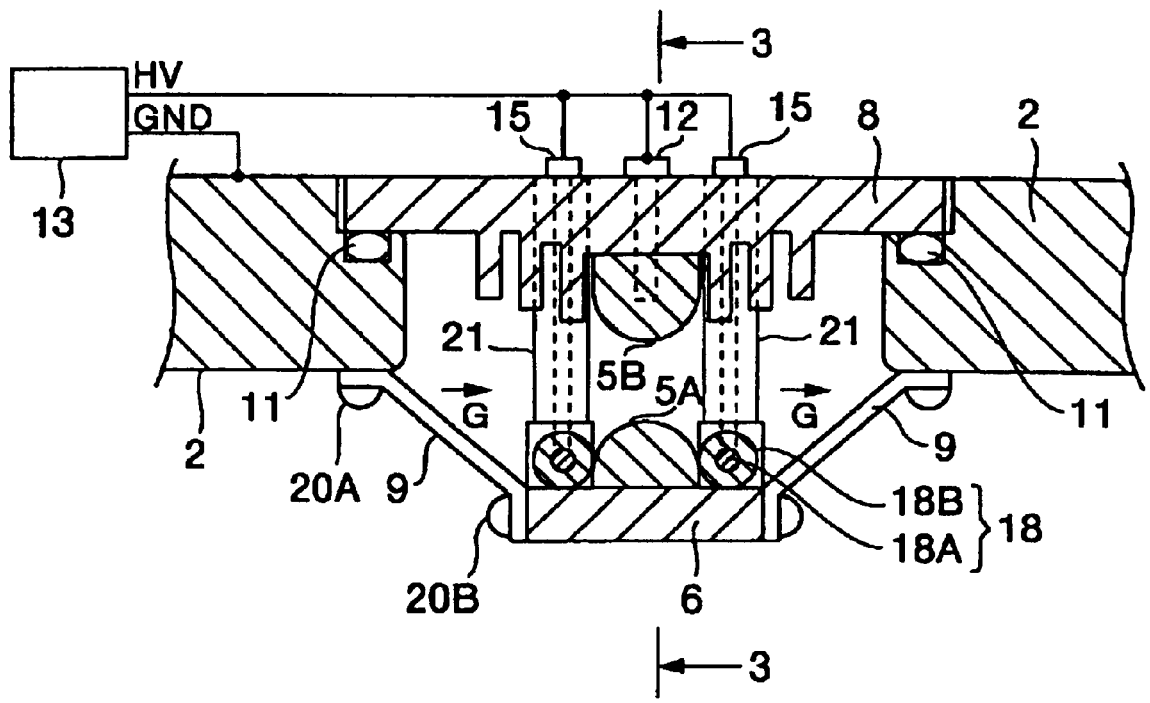
FIG. 2 is a cross sectional view along a line 2—2 in FIG. 1.
Figure 3:
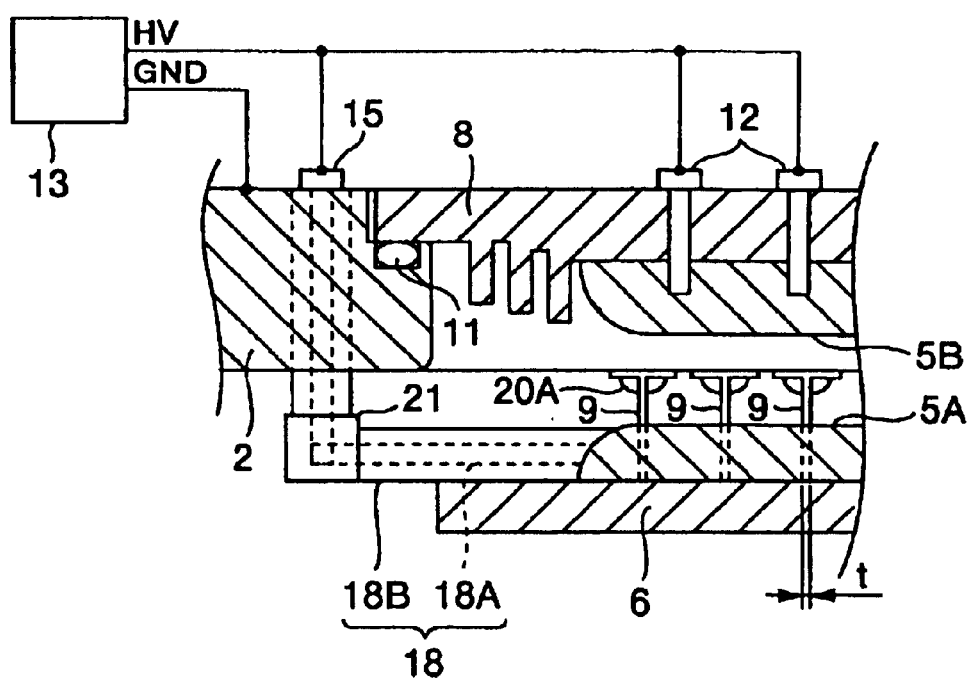
FIG. 3 is a cross sectional view along a line 3—3 in FIG. 2.

FIG. 1 shows a summarized structure of an excimer laser apparatus 1 in accordance with the present embodiment, FIG. 2 shows a cross section along a line 2—2 in FIG. 1, and FIG. 3 shows a cross section in the case of seeing a P portion in FIG. 1 from a direction of an arrow 3—3 in FIG. 2.

In FIGS. 1 to 3, the excimer laser apparatus 1 is provided with a laser chamber 2 for sealing a laser medium such as a laser gas or the like. A pair of discharge electrodes 5A and 5B constituted by an anode 5A and a cathode 5B are arranged at a predetermined position within the laser chamber 2 in an opposing manner to keep a predetermined interval. The excimer laser apparatus 1 applies a high voltage current to a portion between the discharge electrodes 5A and 5B via a discharge circuit (not shown) from a high voltage power source 13 so as to generate a discharge and excites a laser medium so as to oscillate a laser beam.

Further, a once through fan 14 for feeding the laser gas to the portion between the discharge electrodes 5A and 5B, and a heat exchanger 3 for cooling the laser gas heated between the discharge electrodes 5A and 5B due to the discharge are arranged at predetermined positions within the laser chamber 2, respectively.

In this case, in the following description, a direction perpendicular to both of a longitudinal direction of the discharge electrodes 5A and 5B (a lateral direction in FIG. 1) and an opposing direction of the discharge electrodes 5A and 5B (a vertical direction in FIG. 1) (a direction perpendicular to a paper surface in FIG. 1) is called as a depth direction. Further, a longitudinal direction of the electrode and an opposing direction of the electrode are respectively called as a longitudinal direction and an opposing direction. The laser gas flows in the depth direction by the once through fan 14.

A chamber opening portion 4 is provided in an upper portion of the laser chamber 2, and the chamber opening portion 4 is closed by a cathode base 8 made of an insulative body such as a ceramic or the like. An O-ring 11 is interposed between the laser chamber 2 and the cathode base 8 so as to seal the laser gas. A cathode 5B is fixed to the cathode base 8, and the cathode 5B and the laser chamber 2 are electrically insulated by the cathode base 8.

A plurality of high voltage supply rods 12 passing through the cathode base 8 to reach the cathode 5B are arranged in an upper portion of the cathode base 8 in a longitudinal direction at a predetermined interval. The high voltage supply rod 12 is connected to a high voltage side HV of the high voltage power source 13 via a discharge circuit (not shown), whereby the high voltage current is supplied for discharging to the cathode 5B. A portion between the high voltage supply rod 12 and the cathode base 8 is sealed by an O-ring (not shown).

Upper portions of a plurality of return plates 9 constituted by a sheet-like conductive body having a thickness t are fixed to an inner wall lower portion near the chamber opening portion 4 of the laser chamber 2 to keep a predetermined interval in a longitudinal direction by a bolt 20A. The conductive anode base 6 is fixed to the lower portion of the return plate 9 by a bolt 20B, and the anode 5A is mounted to an upper portion of the anode base 6. The laser chamber 2 is connected to a ground side GND of the high voltage power source 13 via a discharge circuit (not shown), and the anode 5A is also set to be the same potential as that of the laser chamber 2 via the return plate 9.

Auxiliary ionization electrodes 18 and 18 are arranged along the longitudinal direction, in both side portions in the depth direction of the anode 5A. The auxiliary ionization electrode 18 is provided with a conductive body portion 18A and an insulative body portion 18B covering an outer periphery of the conductive body portion 18A. A current supply insulative member 21 constituted by an insulative body passes through both end portions in the longitudinal direction of the laser chamber 2, and an auxiliary current supply rod 15 constituted by a conductive body passes through an inner portion of the current supply insulative member 21. The portion between the laser chamber 2 and the current supply insulative member 21 and the portion between the current supply insulative member 21 and the auxiliary current supply rod 15 are both sealed by an O-ring (not shown). The conductive body portion 18A of the auxiliary ionization electrode 18 and the auxiliary current supply rod 15 are electrically connected within the current supply insulative member 21. The high voltage side HV of the high voltage power source 13 is connected to the auxiliary current supply rod 15 via an auxiliary ionization circuit (not shown) so as to supply the high voltage current to the auxiliary ionization electrode 18.

As mentioned above, the return plate 9 is constituted by a thin sheet-like conductive body having a thickness t, and is arranged in parallel to the gas flow G of the laser gas in such a manner as to direct a narrow side to the depth direction, accordingly, a resistance which the return plate 9 applies to the gas flow G is made small, whereby a disturbance of the gas flow G is made minimum. A result obtained by determining an optimum value of the thickness t of the return plate 9 in accordance with a calculation and experimentation is shown as follows.

It is known that the high frequency current flows on the surface of the metal and the higher a frequency becomes, the shallower a depth at which the current enters into the metal becomes. When an entering depth at which the current enters into the metal is set to δ, the entering depth δ can be expressed by the following formula (1).

$$\delta = (2/\omega \cdot \mu \cdot \sigma)^{1/2} \qquad (1)$$

In the formula (1) mentioned above, ω corresponds to a value obtained by expressing the frequency of the high frequency current by an angular frequency, μ corresponds to a permeability of a metal material of the return plate 9, and σ corresponds to a conductivity of the metal material of the return plate 9.

As a material of the return plate 9, a nickel and a copper having corrosion resistance against a laser gas and a high electric conductivity are desirable. The permeability $\mu$ thereof is substantially equal to a permeability of vacuum-condition and is $4\pi \times 10^{31.5}$ H/m. Further, the conductivity $\sigma$ in the copper is $5.88 \times 10^7 \Omega \cdot m$, and the conductivity $\sigma$ in the nickel is $1.35 \times 10^7 \Omega \cdot m$.

Exemplifying the discharge of the excimer laser apparatus, the frequency of the current at a time of discharging becomes substantially 30 MHz. Therefore, in accordance with the formula (1), the entering depth $\delta$ at which the high frequent current reaches in the copper becomes about 1.2 $\mu$m. Further, the entering depth $\delta$ at which the high frequent current reaches in the nickel becomes about 2.5 $\mu$m. Since the entering operation of the high frequency current is generated against both front and back surfaces of the sheet-like return plate 9, the thickness t of the return plate 9 may be equal to or more than 2.4 $\mu$m in the copper case, and may be equal to or more than 5.0 $\mu$m in the nickel case.

Further, for example, even when a slow stand-up component is mixed in the discharge current, the entering depth $\delta$ becomes about 6.6 $\mu$m in the copper case and about 13.7 $\mu$m in the nickel case, for example, on the supposition that the current frequency at the discharge time is 1 MHz. Accordingly, the thickness t of the return plate 9 may be equal to or more than 13.2 $\mu$m in the copper case, and may be equal to or more than 27.4 $\mu$m.

Next, a description will be given of a result of searching an influence which the return plate 9 gives to the flow of the laser gas.

At first, in order to search a lower limit value of the thickness t of the return plate 9, the anode base 6 and the laser chamber 2 are connected by the return plate 9 and the laser gas is flowed between the discharge electrodes 5A and 5B by driving the once through fan 14. As a result, it is known that the return plate 9 does not oscillate as far as the thickness t of the return plate 9 is equal to or more than 100 $\mu$m. Since the thickness t equal to or more than 100 $\mu$m is thicker than the entering depth of the high frequency current, the lower limit value of the thickness t of the return plate 9 may be set to 100 $\mu$m.

Next, a description will be given of a result of experimentation about an upper limit value of the thickness t of the return plate 9.

Figure 4:
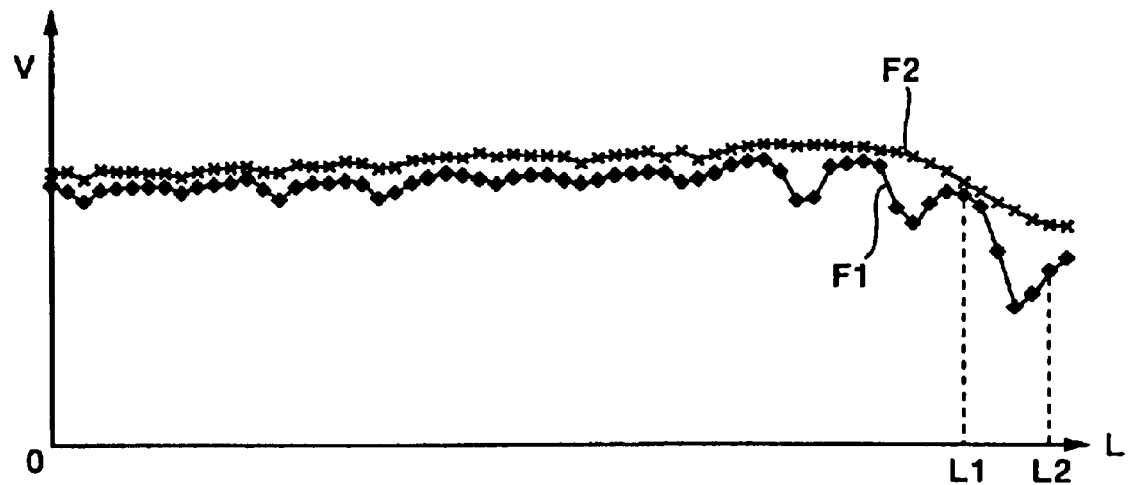
FIG. 4 is a graph showing a relation between a thickness of a return plate and a flow speed of a laser gas.
Figure 5:
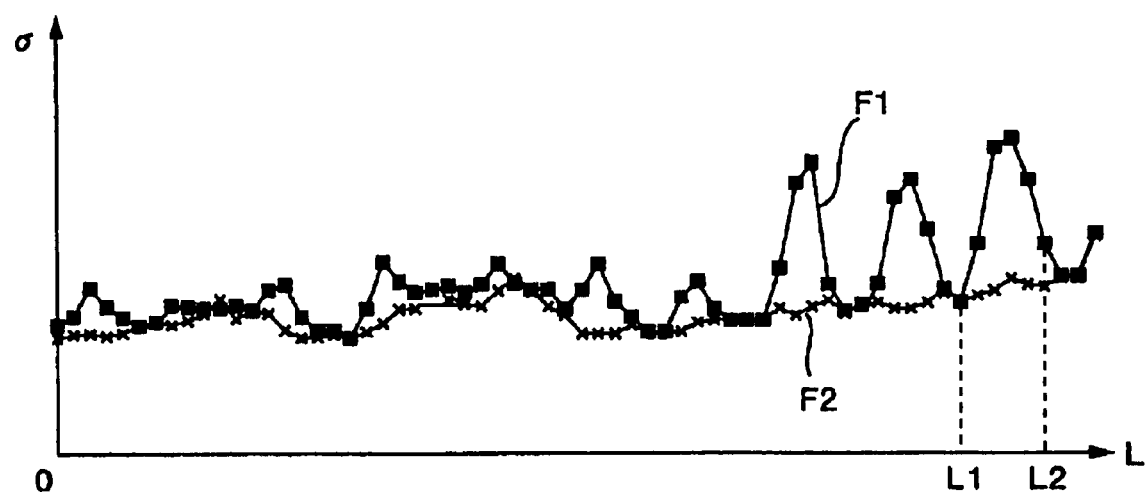
FIG. 5 is a graph showing a relation between a thickness of the return plate and a standard deviation of the flow speed of the laser gas.
Figure 6:
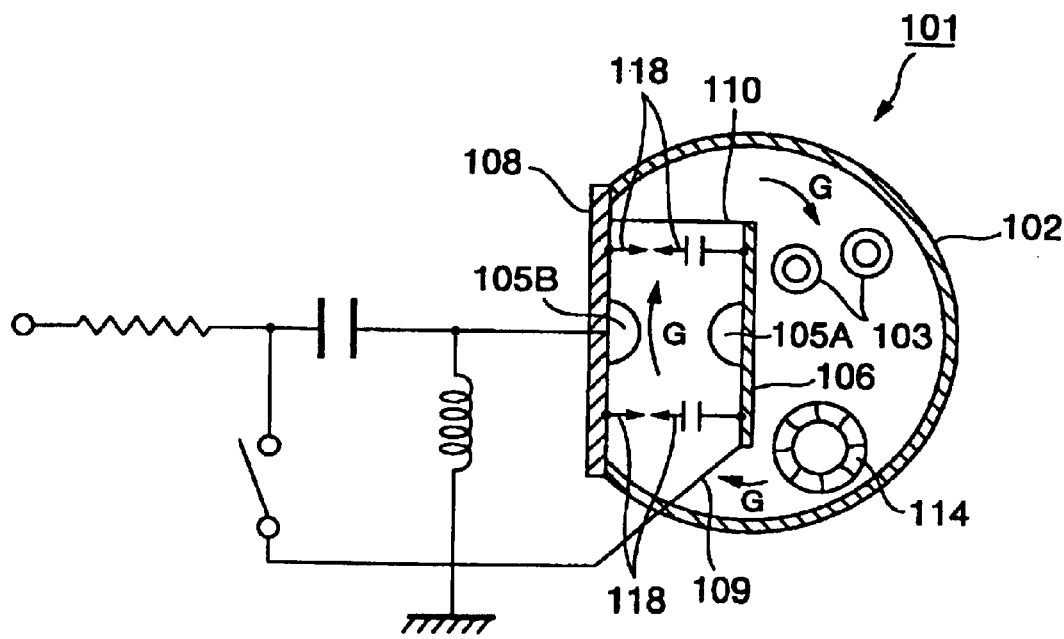
FIG. 6 is a schematic view showing a structure of a discharge exciting laser apparatus in accordance with a conventional art.
Figure 7:
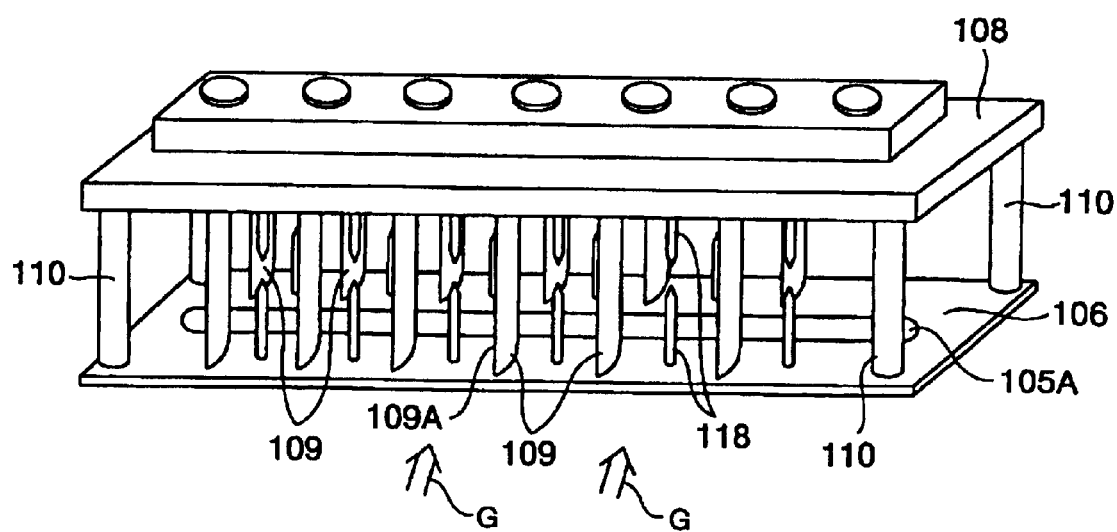
FIG. 7 is a perspective view showing a structure of a discharge electrode in accordance with the conventional art.

FIGS. 4 and 5 show the result of experimentation about a relation between the thickness t of the return plate 9 and the flow speed of the laser gas with using graphs. In FIGS. 4 and 5, a horizontal axis is a distance L between the discharge electrodes 5A and 5B and a center portion in the longitudinal direction, and a range of L between 0 and L2 and a range of L between 0 and L1 respectively show a range in which the discharge electrodes 5A and 5B exist and a discharge area in which the discharge is generated between the discharge electrodes 5A and 5B. a vertical axis in FIG. 4 expresses a flow speed V at each of measuring points. Further, in FIG. 5, a vertical axis expresses a standard deviation a of the flow speed V for one second (1 ms sampling) at each of the measuring points. That is, in FIG. 5, the smaller the standard deviation $\sigma$ is, the smaller a change in time of the flow speed V is.

In FIGS. 4 and 5, a group of data F1 and F1 plotted by black-painted symbols respectively show the flow speed V and the standard deviation a in the case of employing the return plate 9 having a thickness t=1 mm. Further, a group of data F2 and F2 plotted by x symbols respectively show the flow speed V and the standard deviation a in the case of employing the return plate 9 having a thickness t=500 $\mu$m. As shown in FIGS. 4 and 5, it is known that the gas flow G having the greater flow speed V in the end portion of the discharge electrodes 5A and 5B and the smaller change in time in comparison with the case that the thickness t is 1 mm, by setting the thickness t to 500 $\mu$m.

As mentioned above, in accordance with the present embodiment, the thickness t of the return plate 9 is set to be equal to or more than 100 $\mu$m and equal to or less than 500 $\mu$m. Since the return plate 9 is thicker than the entering depth of the high frequency current by setting the thickness t of the return plate 9 to be equal or more than 100 $\mu$m, the resistance of the current flowing through the return plate 9 is not increased. Accordingly, the high frequency current properly flows through the return plate 9 and a stable discharge can be performed. Further, the return plate 9 is hardly vibrated due to application of a force by the laser gas, and a stable discharge can be performed without preventing the laser gas flow.

Further, by setting the thickness t of the return plate 9 to be equal or less than 500 $\mu$m, the disturbance of the flow speed V of the laser gas is reduced and the flow speed V is increased in comparison with the conventional thickness t=1 mm. Accordingly, the discharge can be made stable and a power of the laser beam is increased.

What is claimed is:

1. A discharge electrodes connecting structure for a laser apparatus comprising:

a pair of anode and cathode provided within a laser chamber for sealing a laser gas in an opposing manner, generating a discharge so as to excite a laser gas flowing therebetween and oscillating a laser beam;

a conductive anode base holding the anode;

an insulative cathode base holding the cathode;

a return plate electrically connecting the anode base to said laser chamber so as to supply a current to the anode and having a thickness of equal to or more than 100 $\mu$m and equal to or less than 500 $\mu$m; and a high voltage power source supplying a high frequency current between the anode and the cathode;

wherein said high frequency current includes frequencies which are more than 1 MHz, and said return plate is thicker than double an entering depth of the high frequency current and restrainable from vibrating the return plate due to the laser gas flow.

2. A laser apparatus comprising:

a laser chamber sealing a laser gas;

discharge electrodes constituted by a pair of anode and cathode provided within the laser chamber in an opposing manner, generating a discharge so as to excite a laser gas flowing therebetween and oscillating a laser beam;

a conductive anode base holding the anode;

an insulative cathode base holding the cathode;

a return plate electrically connecting the anode base to said laser chamber so as to supply a current to the anode; and a high voltage power source supplying a high frequency current between the anode and the cathode;

wherein said high frequency current includes frequencies which are more than 1 MHz, and said return plate is thicker than double an entering depth of the high frequency current and restrainable from vibrating the return plate due to the laser gas flow;

wherein a thickness of the return plate is set to be equal to or more than 100 $\mu$m and equal to or less than 500 $\mu$m, and the return plate is arranged substantially in parallel to the laser gas flow between said discharge electrodes.

* * * * *